Patented Jan. 27, 1931

1,790,088

UNITED STATES PATENT OFFICE

JOSEPH H. BRENNAN, OF NIAGARA FALLS, NEW YORK, ASSIGNOR TO ELECTRO METAL-LURGICAL COMPANY, A CORPORATION OF WEST VIRGINIA

REMOVING ARSENIC FROM ORES

No Drawing.    Application filed December 8, 1926.   Serial No. 153,457.

The invention relates to the utilization of arsenic-contaminated tungsten ores for the production of metals and alloys in which the presence of arsenic is detrimental, and it has as its object the elimination of the major portion of the arsenic in the ore and the recovery of the metal values of the ore as metal or alloy of tolerable arsenic content. The invention is applicable to such ores as wolframite, scheelite, ferberite, and hubnerite.

The invention comprises a treatment whereby arsenic is converted into volatile compounds and expelled by heat. For this purpose the ore is heated with sulphur in elemental form.

The ore to be treated is preferably ground to 10 mesh or finer before applying the invention, though arsenic may be more or less completely removed from ore in a coarser state. The sulphur may be uniformly admixed with the ground ore, or it may be localized, preferably beneath, or in the lower part of the mass of ore so that upon heating the latter sulphur-containing vapors will permeate the ore. The sulphur may also be volatilized in a separate furnace and its vapors conducted through or over the heated ore.

The quantity of sulphur employed depends on the fineness and degree of contamination of the ore, on the type of furnace used in the process, and on other factors. An excess of sulphur ordinarily does no harm, since it is completely volatile and leaves little or no residual sulphur in the ore. When the sulphur is applied by mixing it with the ore and then heating the mixture, a rapid heating often permits a smaller quantity of the sulphur agent to be used: with slower heating there is a tendency for the sulphur to escape in the early stages of the heating without attacking the arsenic. The maximum temperature required for the expulsion of the arsenic may be 800° C., more or less, and this temperature is preferably maintained for some time, for example three hours, more or less.

The purification of the ore may in some cases take place in the furnace in which the smelting of the ore is to be carried out, and in the presence of the reducing agent which is to be used in the smelting. However, the most desirable conditions for expelling the arsenic usually include much lower temperatures than those for which the smelting furnace is designed, and periods of time which would unduly interfere with the regular use of the smelting furnace, and it is therefore preferred in some cases to carry out the purification in a separate furnace which may be for example a muffle furnace, reverberatory furnace, or any stationary or revolving roasting or calcining furnace in which the necessary temperature can be attained.

In a particular run, wolframite containing 1.76% As was ground to 40 mesh, mixed with 5% its weight of elemental sulphur and heated to 800° C. for three hours. After this treatment the ore contained only 0.03% As.

I claim:

1. The process which comprises treating an arsenic-contaminated tungsten ore with sulphur, the latter being in the free state when brought into contact with the ore, and heating the ore to a temperature above the boiling point of sulphur, and sufficiently high to volatilize the major portion of the arsenic present.

2. The process which comprises mixing an arsenic-contaminated tungsten ore with elemental sulphur, slowly heating the mixture to about 800° C., and holding the charge at a high temperature until the sulphur and arsenic are substantially eliminated.

In testimony whereof, I affix my signature.

JOSEPH H. BRENNAN.